Patented Nov. 25, 1952

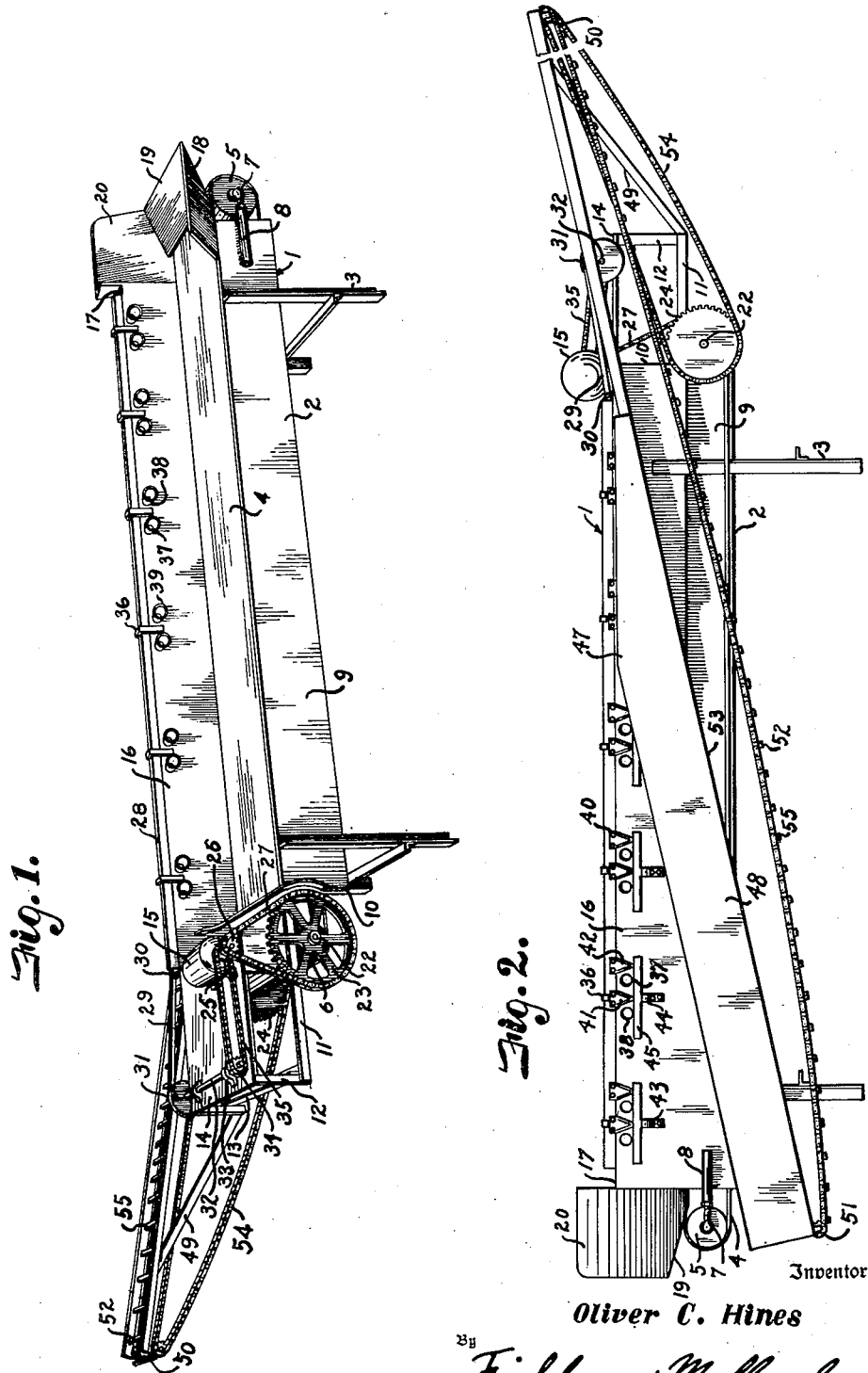

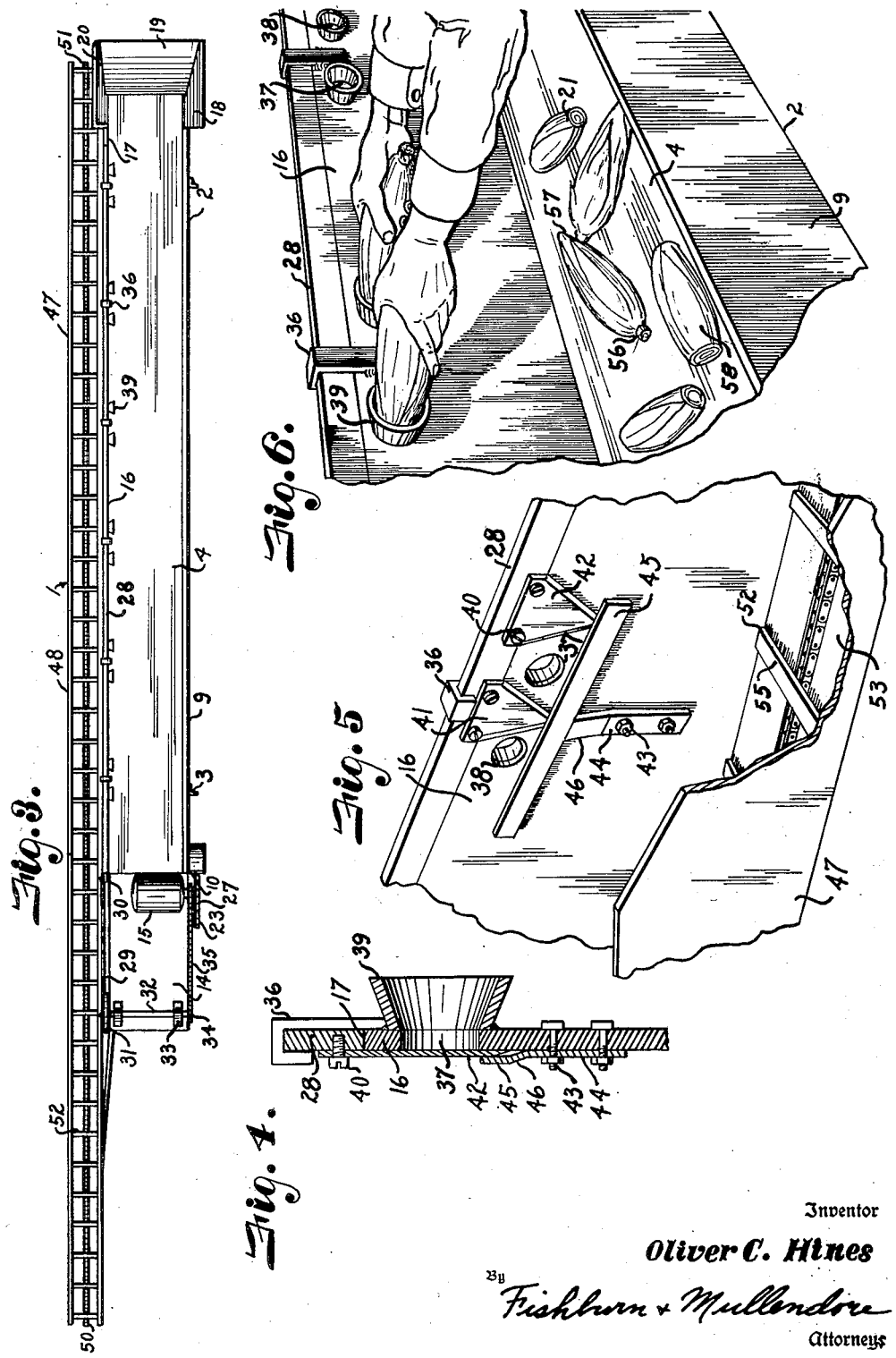

2,619,140

UNITED STATES PATENT OFFICE 2,619,140

DEVICE FOR CUTTING THE ENDS OF EARS OF CORN

Oliver C. Hines, Kansas City, Kans.

Application April 6, 1949, Serial No. 85,821

1 Claim. (Cl. 146—84)

This invention relates to a corn trimming device, and more particularly to a device for cutting off the waste ends from the ears of corn with the husks thereon.

The device is particularly adaptable for preparing ears of corn, particularly sweet corn, for shipment to be sold over the counter in stores. The ears of corn as they are pulled from the stalk have a stem or shank portion on the butt end of the ear and the other ends have the silk and husks extending thereover. The raising and marketing of sweet corn has become quite an extensive industry and it is necessary to process the ears in mass quantities in order to get the corn to market as quickly as possible after picking so that it will be fresh for the consumer's use.

It is a principal object of the present invention to provide a device for cutting both the butt and silk ends off the ears of corn so that the husks will remain thereon for keeping the corn in fresh condition and permit packing of the ears of corn in sacks or other containers to utilize as little space as possible. Clipping off the ends also provides a better looking product particularly since silk ends of many ears have a wormy portion.

Other objects of the present invention are to provide a table or support over which an endless belt is moved to carry the corn thereacross; to provide a wall or plate extending upwardly from one side of the table upon which is mounted a reciprocable cutter; to provide the wall with spaced openings adapted for the reception of the ends of ears so that when the ears are held manually with the ends in the openings, the reciprocable cutter will clip them off; to provide a travelling platform for carrying off the removed ends of the ears of corn to a place of disposal; to provide means for reciprocating the cutter on the wall of the table; and to provide a device of this character that is simple, economical to manufacture, and efficient in operation.

In accomplishing these and other objects of the present invention, I have provided improved details of structure, the preferred forms of which are illustrated in the accompanying drawings, wherein:

Fig. 1 is a perspective view of a trimming or clipping device embodying the features of my invention;

Fig. 2 is a side view taken from the back of the device;

Fig. 3 is a top plan view of the device;

Fig. 4 is a vertical cross sectional view through the wall of the table showing the cutting mechanism and opening for receiving the ears of corn;

Fig. 5 is fragmentary perspective view of the back side of the wall of the table and illustrating the cutting mechanism and the travelling platform for carrying away the removed ends of the ears;

Fig. 6 is a fragmentary perspective view of the front of the table wall showing ears of corn with the ends projected into the cutter openings.

Referring more in detail to the drawings:

1 designates a corn trimming device embodying the features of my invention, comprising a framework 2 supported on legs 3 for mounting of an endless belt conveyor 4 passing over rollers 5 and 6 at the respective ends of the framework structure. The roller 5 is supported on a shaft 7 having arms 8 rigidly secured to the framework structure 2 as best illustrated in Fig. 1. The framework structure has depending sides 9 extending along the legs 3. Extending outwardly from the end 10 of the framework structure are bars 11 provided at their outer ends with uprights 12 and interconnected by a cross member 13 upon which uprights is mounted a platform 14 mounting a motor 15 for operating the mechanism as later described.

Mounted on the back side of the framework 2 above the side 9 is an upwardly extending wall or plate member 16 having a flat top surface as indicated at 17 (Fig. 4). One side of the platform 14 is secured to the wall 16 to lend support to the structure. The forward end of the framework 2 is provided with a hopper comprising a side member 18, and 19, and back side 20 to provide a receptacle for the ears of corn 21 above the endless conveyor 4 which moves the corn along the framework.

The roller 6 of the endless belt 4 is mounted on a shaft 22 supported rearwardly of the framework 2 by suitable arms (not shown) and mounted on each end of the shaft 22 are sprocket wheels 23 and 24. The motor 15 is provided with the usual shaft having sprockets 25 and 26. A chain 27 is provided for engaging over the sprocket wheel 26 and the wheel 23 for driving the endless belt 4 upon operation of the motor.

A bar 28 is mounted for reciprocation on the flat bearing surface 17 of the plate member 16 and is adapted to be reciprocated thereon by a pitman 29 having connection therewith as indicated at 30 and eccentrically connected to a wheel 31 mounted upon a shaft 32 supported on the platform 14 by bearings 33. The opposite end of the shaft 32 has a sprocket 34 over which a chain 35 runs and having connection with the sprocket 25 on the motor 15. A plurality of spaced brackets 36 are rigidly secured to the inside of the wall 16 having their upper ends turned over forming a U-shaped portion to retain the reciprocating bar 27 on the plate member.

The wall 16 is provided with pairs of spaced openings 37 and 38 and rigidly mounted within the openings are cone shaped recepticles 39 through which the ends of the ears of corn are to be inserted as best illustrated in Fig. 6.

Mounted on the reciprocating bar 28 by fastening devices 40 are spaced cutters 41 and 42 the cutters being situated adjacent the openings 37 and 38 in the plate 16 so that when the bar is reciprocated the cutters will pass over the openings for severing the ends of corn as will later be described. Mounted on the outside of the wall 16 beneath the openings 37 and 38 by bolts or the like 43 are spaced brackets 44 having a cross arm 45 on their upper ends and spaced from the wall 16 a distance substantially equal to the width of the cutters 41 and 42 as best illustrated at 46 (Fig. 4) for the purpose of retaining the cutters substantially adjacent the outside of the plate 16.

Mounted on the back of the framework structure 2 below the cutting mechanism on the wall 16 is an inclined framework 47 having an outer side wall 48, a brace 49 having one end secured to one of the uprights 12 and the other end of the frame is provided for supporting the same. Mounted on the respective ends of the structure are sprockets 50 and 51 over which is adapted to run an endless apron. The framework 47 is provided with a bottom 53 over which the endless apron 52 is adapted to run through a chain 54 engaging the sprockets on its respective ends and also the sprocket wheel 24 on the end of the shaft 22 so that operation of the motor to drive the sprocket 23 will also drive the sprocket 24 and operate the endless apron to carry away the removed ends of the ears of corn to the place of disposal. The endless apron is provided with the usual cleats 55 and the platform 47 is set at an angle with respect to the framework structure so that the outer end will be high enough in order that the cuttings may fall into a truck, sack, or other container.

If desired, a stop member (not shown) may be mounted at the rear end of the device in front of the motor for preventing the ears of corn from passing over the table should the operators not be able to handle the ears fast enough on the moving belt 4.

Operation of the device constructed and assembled as described is as follows:

Ears of corn having the shanks 56 on the butt ends and the silk on the small end 57, are deposited in the hopper on the front end of the device and the travelling belt 4 will carry them along in front of the openings 37 and 38 in the wall 16. Workmen stand in front of the table and pick up an ear 21 in each hand as indicated in Fig. 6 and insert one end of the ears in the openings 37 and 38. The bar 28 carrying the cutter blades 41 and 42 operated by the motor 15 through the pitman 29 will cause the cutters to clip off the ends of the ears of corn, the removed ends falling upon the endless apron 52. The operator then turns the ears to project the opposite through the openings so that they are clipped off to leave the ears of corn as indicated at 58 (Fig. 6). The ears of corn then are packed in sacks or other containers for removal to a shipping place.

It will be obvious from the foregoing that I have provided an improved cutter device for removing the ends from ears of corn which is positive in action and in which the severed ends are removed to a place of disposal and the clipped ears are removed to be packed for shipment.

Attention is also directed to applicant's copending application Serial No. 152,931 filed March 30, 1950, which is directed to the same type of cutter device including the specific lubrication means for the cutter bar.

What I claim and desire to secure by Letters Patent is:

In a device of the character described, a plate member having an upper edge forming a track and having a pair of openings spaced below the track to provide annular cutting edges at one side of the plate member, a bar mounted on the track for reciprocatory movement, cutters projecting downwardly from the bar alongside said plate, a guide bracket fixed to the plate member intermediate said openings and having a U-shaped hook portion engaging over the bar to retain the bar in contact with the track, and a bracket on the side of the openings opposite said guide bracket and having an elongated guide portion extending parallel with the bar in overlapping relation with the cutters to cooperate with the bar retaining bracket in supporting the cutters in shearing relation with the cutting edges of the openings.

OLIVER C. HINES.

REFERENCES CITED

The following references are of record in the file of this patent:

UNITED STATES PATENTS

| Number | Name | Date |
|---|---|---|
| 711,088 | Weaver | Oct. 14, 1902 |
| 887,236 | Dunbar | May 12, 1908 |
| 1,949,779 | Bushkovski | Mar. 6, 1934 |
| 2,481,947 | Philkoff | Sept. 13, 1949 |
| 2,511,464 | Cover | June 13, 1950 |